United States Patent [19]

Shimoda et al.

[11] Patent Number: 4,985,755
[45] Date of Patent: Jan. 15, 1991

[54] AREA SPECIFYING SIGNAL GENERATION DEVICE USING OUTPUT VIDEO SIGNAL FROM VIDEO CAMERA

[75] Inventors: Kenji Shimoda; Shin-ichi Oosawa, both of Yokohama, Japan

[73] Assignee: Kabushiki Kaisha Toshiba, Kawasaki, Japan

[21] Appl. No.: 456,736

[22] Filed: Dec. 26, 1989

[30] Foreign Application Priority Data

Dec. 27, 1988 [JP] Japan .................. 63-329757

[51] Int. Cl.$^5$ .................. H04N 9/74; H04N 5/262
[52] U.S. Cl. .................. 358/22; 358/183; 382/48
[58] Field of Search .................. 358/183, 22, 182; 382/18, 25, 48; 340/730, 732

[56] References Cited

U.S. PATENT DOCUMENTS

| | | | |
|---|---|---|---|
| 3,936,868 | 2/1976 | Thorpe | 358/183 |
| 4,028,727 | 6/1977 | Skrydstrup | 358/182 |
| 4,110,786 | 8/1978 | Mignot et al. | 358/22 |
| 4,217,604 | 8/1980 | Wozniak | 358/183 |
| 4,673,983 | 6/1987 | Sarugaku et al. | 358/183 |

FOREIGN PATENT DOCUMENTS 63-260376 10/1988 Japan .

Primary Examiner—John K. Peng
Attorney, Agent, or Firm—Cushman, Darby & Cushman

[57] ABSTRACT

A memory stores area specifying data for controlling a switch in the path of a signal of a first image in order to replace a portion of a first video signal with another signal (second video signal or the like). The control data of the memory can be obtained by converting a video signal, derived by use of a video camera, into a binary signal by a binary-coding circuit. In this case, a subject photographed by the video camera is a sheet of white rectangular paper on which an area edged or surrounded by a boarder line is specified, for example. In order to create the above area specifying data by photographing the subject on which the edged or surrounded area is specified, an edge counter, an odd/even number detection circuit, a flip-flop circuit, an AND circuit and a delay circuit are provided. That is, when an edge signal is supplied, the edge counter counts the edge signal and the odd/even number detection circuit and determines whether the counted value is odd or even. Then, the flip-flop circuit can produce a signal corresponding to the area specified by the subject between the odd numbered edge signal to the even numbered edge signal. As a result, the above area specifying data can be obtained from the AND circuit.

5 Claims, 8 Drawing Sheets

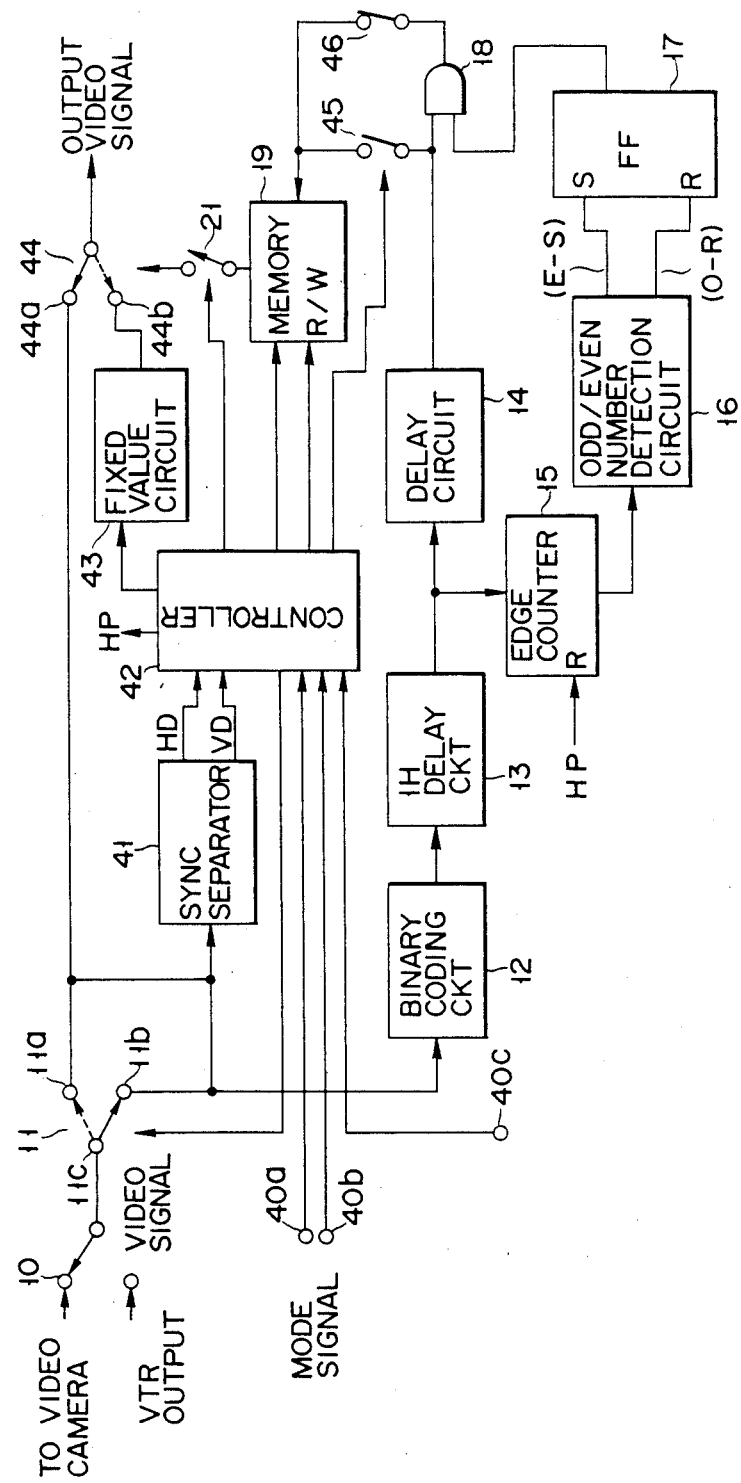
F I G. 1

F I G. 2A
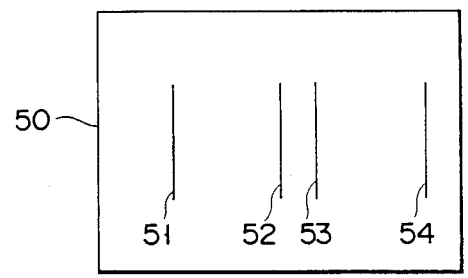
F I G. 2B
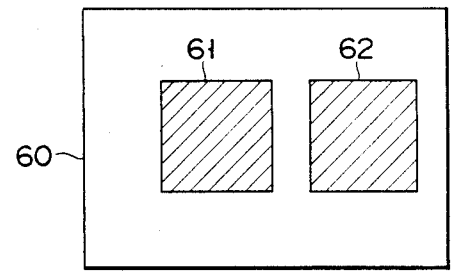
F I G. 2C
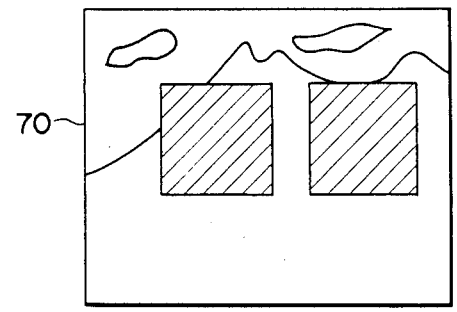

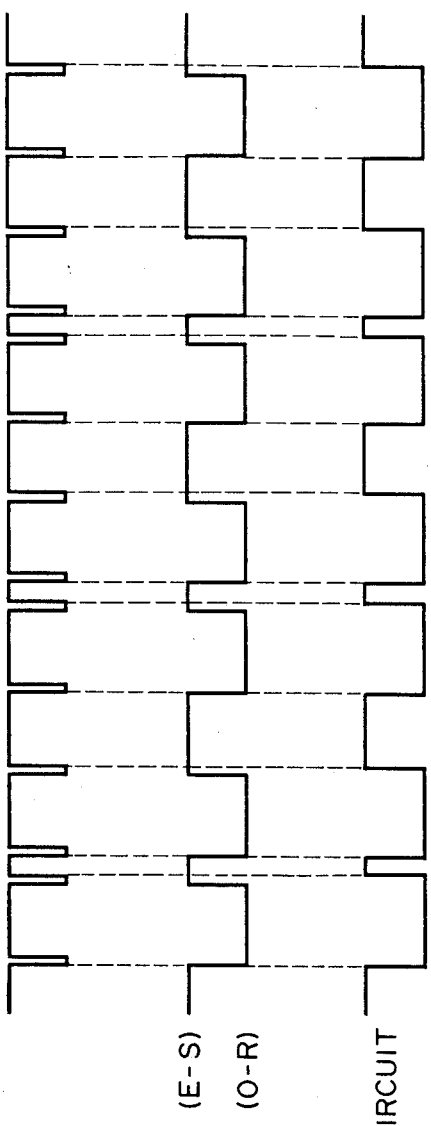
FIG. 3A  HP
FIG. 3B  EDGE
FIG. 3C  FF17 (E-S) (O-R)
FIG. 3D  AND CIRCUIT 18

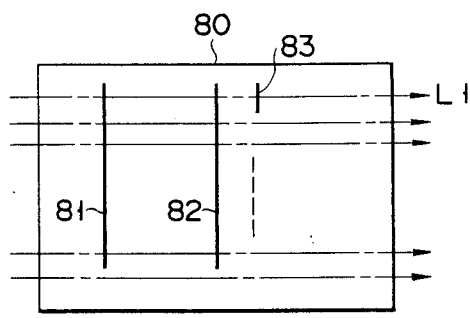
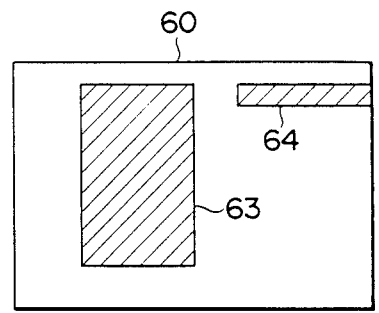
FIG. 4A          FIG. 4B
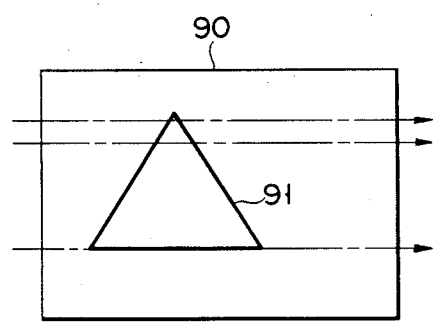
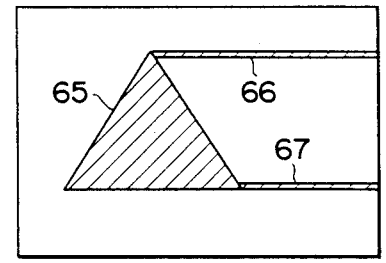
FIG. 5A          FIG. 5B

AREA SPECIFYING SIGNAL GENERATION DEVICE USING OUTPUT VIDEO SIGNAL FROM VIDEO CAMERA

BACKGROUND OF THE INVENTION

1. Field of the Invention

This invention relates to an area specifying signal generation device using an output signal from a video camera.

2. Description of the Related Art

A camera-integrated type VTR which has a video camera and a video tape recorder formed integrally with each other is known in the art. The camera-integrated type VTR has a function called a title insert.

When the title insert function is effected, the camera-integrated type VTR is set into the title photographing mode at the first stage. In this state, if a subject (white rectangular paper) on which the title is previously drawn is set in the visual field of the camera and photographed, an image signal thus obtained is converted in a digital signal and stored in a memory. When the camera-integrated type VTR is changed from the ordinary photographing mode to the title insertion mode at the second stage, an area specifying signal which specifies an area corresponding to the title portion is read out from the memory. The area specifying signal controls a switch provided in the signal path for a video signal derived by the current photographing operation so as to convert portions of the video signal corresponding to the title into a black or white level. As a result portions of the video signal derived by the current photographing operation are replaced by the title letters at the black level, thus permitting the title to be inserted into the video signal.

The title insert function permits a picture elimination process to be effected. The picture elimination process is to replace portions of the video signal currently produced by a black level signal, for example. In order to effect the process, the camera-integrated type VTR is first set into the title photographing mode. Then, a subject having a portion previously painted black is photographed and then an area specifying signal specifying the black level area is stored in the memory. After this, when the camera-integrated type VTR is changed from the ordinary photographing mode to the title insertion mode, the area specifying signal specifying the black level area is read out from the memory. The area specifying signal controls a switch provided in the signal path for a video signal derived by the current photographing operation so as to convert portions of the video signal into a black or white level signal. As a result, portions of the image signal are fully replaced by the black or white level signal, thus causing the picture to be selectively removed.

With the conventional camera-integrated type VTR described above, for example, a sheet of white rectangular paper is prepared in order to store elimination data into the memory. The white paper is set in the visual field of the camera and a partial area of the paper to be subjected to the picture elimination process is painted black. The paper thus painted is photographed by the camera-integrated type VTR set in the title photographing mode. Then, the black-painted portion is photographed so as to produce black level data which is in turn stored into the memory.

As described above, in the conventional system, it is necessary to paint a partial area of the white paper corresponding to the picture elimination area black in order to store black level data for picture elimination into the memory. For this reason, the user must paint a larger area black as the picture elimination area becomes larger. Such an operation is extremely troublesome for the user.

SUMMARY OF THE INVENTION

Accordingly, an object of this invention is to provide an edging signal generation device using an output video signal for the video camera, in which a picture elimination portion can be specified on a sheet of paper by merely specifying an area corresponding to the picture elimination portion by an edging operation or drawing an area-defining boarder line instead of painting all the picture elimination portion black, thus permitting the operational load of the user to be reduced.

The above object can be attained by an area specifying signal generation device, comprising binary-coding means for converting into a binary-coded signal an image signal which is derived by photographing a subject having a solid-color surface on which an area edged or surrounded by a boarder line is specified, and which includes an edge signal corresponding to the surrounded area; 1 H delay means for delaying an output video signal of the binary-coding means by one horizontal scanning period; edge counting means connected to receive an output video signal from the 1 H delay means and reset at each horizontal period, for counting the edge signal by effecting the counting-up operation each time the edge signal corresponding to the surrounded area is supplied; odd/even number detection means for determining whether a counting output of the edge counting means is odd or even, to supply an odd/even number detection signal indicating that the counting output of the edge counting means is odd or even; gate switching means for supplying an inverted or non-inverted signal in response to an odd number detection signal or even number detection signal from the odd-/even number detection means; a delay circuit for delaying the output of the 1 H delay means to synchronize the output of the 1 H delay means with the inverted or non-inverted output of the gate switching means; logic means connected to receive the output of the delay circuit and the inverted or noninverted output of the gate switching means, for supplying an output signal, corresponding to the logical product of the outputs of the delay circuit and the gate switching means, to construct area specifying data specifying an area from the odd numbered counting output to the even numbered counting output; a memory for storing the area specifying data; readout means for reading the area specifying data from the memory in synchronism with a video signal to be processed; and switching means controlled by the area specifying data read out by the readout means, for replacing the to-be-processed video signal by another signal and generating the same when the area specifying data is set at a preset level.

BRIEF DESCRIPTION OF THE DRAWINGS

FIG. 1 is a circuit block diagram showing a circuit according to one embodiment of this invention;

FIGS. 2A to 2C are views for illustrating examples of a subject, memory space and image shown for explaining the operation of the device of this invention;

FIGS. 3A to 3D are timing charts for illustrating the operation of the circuit of FIG. 1;

FIGS. 4A and 4B are views for illustrating examples of a subject and memory space shown for explaining problems of the circuit of FIG. 1;

FIGS. 5A and 5B are views for illustrating examples of a subject and memory space shown for explaining problems of the circuit of FIG. 1;

DETAILED DESCRIPTION OF THE PREFERRED EMBODIMENTS

Figure 6:
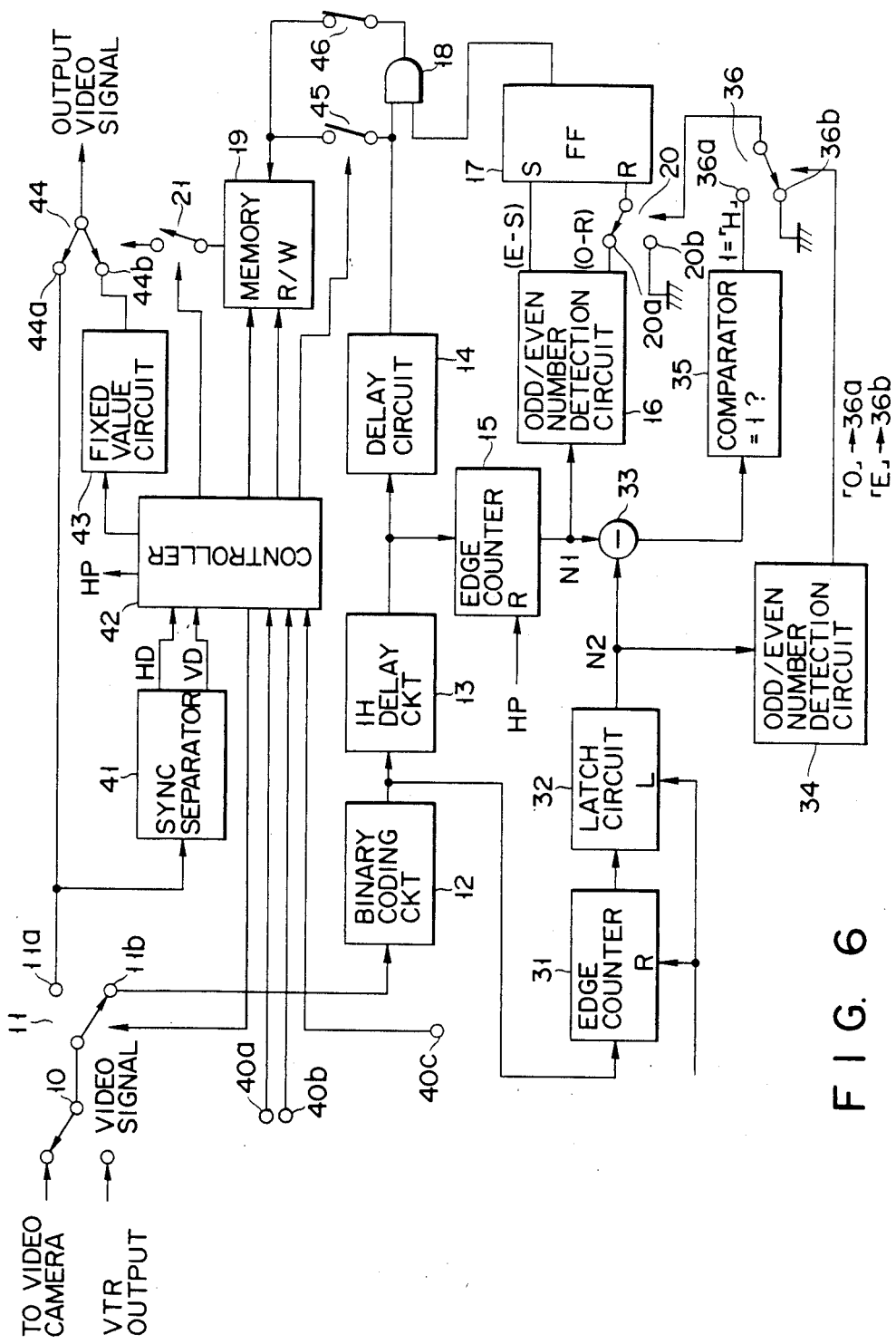
FIG. 6 is a circuit block diagram showing a circuit according to another embodiment of this invention.

An embodiment of this invention will now be described with reference to the accompanying drawings.

FIG. 1 shows a circuit according to one embodiment of this invention. For example, an input terminal 10 is supplied with a video signal from a video camera. It is also possible to input a reproduced video signal from a VTR to the input terminal 10. A video signal received into the input terminal 10 is supplied to the movable contact of a switch 11. The switch 11 can be set to selectively supply the received video signal to a fixed contact 11a or 11b. The switching state of the switch 11 in FIG. 1 indicates a case wherein the picture elimination mode is specified, that is, the switch 11 is set to supply the video signal to the fixed contact 11b. The video signal on the fixed contact 11b is supplied to a binary-coding circuit 12. For example, the binary-coding circuit 12 outputs "0" or "1" when the input video signal is at a black level or white level, respectively. The binary-coded video signal from the binary-coding circuit 12 is supplied to a 1 H delay circuit 13 having a delay time corresponding to a one-horizontal scanning period (1 H).

The video signal from the 1 H delay circuit 13 is supplied to edge counter 15 and delay circuit 14. The edge counter 15 adds up the count by determining that the edge is detected when, for example, the binary-coded signal has changed from white level to black level. The edge counter 15 is reset by a horizontal pulse HP, synchronized with the video signal. Thus, data of count N1 from the edge counter 15 gradually increases from 0 during the one horizontal scanning period.

Output data from the edge counter 15 is supplied to an odd/even number detector 16. The odd/even number detector 16 determines whether the count N1 is odd or even. The odd/even number detector 16 supplies a reset pulse (O-R) or set pulse (E-S) to a flip-flop circuit 17 when the count N1 is detected to be odd or even, respectively. As a result, the output of the flip-flop circuit 17 is set to a low level (reset output) or high level (set output) respectively, when a first (odd) edge signal or a second (even) edge signal is supplied.

The output (odd/even number determination signal) of the flip-flop circuit 17 is supplied to one of the input terminals of an AND circuit 18 which receives a binary-coded video signal from the delay circuit 14 at the other input terminal. The delay circuit 14 functions to synchronize the edge signal included in the binary-coded video signal with the odd/even number determination signal from the flip-flop circuit 17.

An output signal from the AND circuit 18 is a signal indicating the interval between the odd- and even-numbered edge signals or an area specifying signal indicating the area specified by the edge signals, and is supplied to a memory 19. The application of a switch 46 is described later. The memory 19 has a memory capacity of one field, for example, and the write-in address thereof is designated by means of a controller 42.

The controller 42 functions to set the operation modes of the device and generates various timing pulses. The controller 42 is supplied with a mode signal for setting an operation mode via a terminal 40. The mode signal may be generated by operation of a key or keys on the operation panel by the user. Assume now that the area specifying mode is set. Then, the controller 42 sets the switch 11 on the side of the contact 11b, turns off the switch 21 and sets the memory 19 to the write-in mode. Under this condition, if the user photographs the subject described above, a video signal derived by the photographing operation is supplied to the binary-coding circuit 12 and sync separator circuit 41. A vertical synchronizing signal VD and a horizontal synchronizing signal HD separated by the sync separator circuit 41 are supplied to the controller 42. Then, the controller 42 outputs a reset pulse HP to the edge counter 15 and a write-in timing pulse to the memory 19 based on the horizontal synchronizing signal HD and the vertical synchronizing signal VD.

After the area specifying signal is written into the memory 19, and when the mode signal is set to a picture elimination mode signal, the controller 42 sets the switch 11 on the side of the contact 11a, turns on the switch 21 and sets the memory 19 into the readout mode. When a to-be-processed video signal is supplied to the contact 11a, the data readout operation of the memory 19 is started in response to the video signal supplying operation. Data read out from the memory 19 is used to control the switch 44. While the data from the memory 19 is kept at "0", the switch 44 is set on the side of the contact 44b to derive a signal from a fixed value circuit 43. On the other hand, while the data from the memory 19 is kept at "1", the switch 44 is set on the side of the contact 44a to receive the video signal which is supplied to the contact 11a in its original state. The fixed value circuit 43 is used to output a constant black or white level signal, for example.

FIGS. 2A to 2C show examples of a subject 50, a memory space 60 of the memory 19, and an image 70 obtained as a result of the picture elimination process. FIGS. 3A to 3D show timing charts of the circuit according to this embodiment.

FIG. 2A shows an example of the subject 50 on which a border line or edge for defining a picture elimination area is drawn. Vertical bars 51 to 54 are borders drawn by the user. The subject 50 is set in the visual field of the camera before it is photographed. The bars 51 to 54 of the subject 50 shown in FIG. 2A are respectively odd-, even-, odd- and even-numbered bars when counted in the horizontal scanning direction. The output of the flip-flop circuit 17 is set to a low level between the odd-numbered bar and even-numbered bar, and is set to a high level between the even-numbered bar and odd-numbered bar. Therefore an area specifying signal for specifying the hatched area in FIG. 2B can be output. FIG. 2B shows the memory space 60 of the memory 19. Data of hatched areas 61 and 62 is "0" and is used as an area specifying signal. FIG. 3A shows a horizontal synchronizing pulse Hp output from the controller 42, FIG. 3B shows an edge signal derived in correspondence with the bars 51 to 54 and supplied to the edge counter 15, FIG. 3C shows an output of the flip-flop circuit 17 and FIG. 3D shows an output of the AND circuit 18.

After the area specifying signal is stored into the memory 19 and when the picture elimination mode is set and, for example, a scene of mountains is photographed, then the hatched areas are replaced by black or white level signals as shown in FIG. 2C.

In the above explanation, the area specifying signal is created between the odd- and even-numbered edge signals. However, in a case where a sheet of paper on which a picture eliminating area is painted out is photographed in the same manner as in the prior art without using the above-described function, or a sheet of paper on which a title is drawn is photographed to store the title data into the memory 19, a signal for specifying the title data creation mode is supplied from the contact 40b to the controller 42. Then, the controller 42 turns on the switch 45 and turns off the switch 46. As a result, the binary-coded signal is supplied to the memory 19 as is. It is also possible to supply a mode signal for specifying the normal mode to the controller 42, although not shown. In this case, the switch 11 is kept set on the side of the contact 11a and the switch 44 is kept set on the side of the contact 44a.

In the above embodiment, four (even number) bars 51 to 54 are drawn on the subject 50.

However, as shown in FIG. 4A, for example, a bar 83 which is inadvertently drawn by the user may be present on a subject 80 in addition to normal bars 81 and 82. For this reason, an odd number of edge signals appear in a certain period of time. When the subject 80 is photographed to create an area specifying signal and the edge of the bar 83 is reached, the flip-flop circuit 18 is reset. As a result, an erroneous area specifying signal 64 is stored into the memory 19 together with a correct area specifying signal 63 as shown in FIG. 4B. In a case where a subject 90 on which a triangle 91 shown in FIG. 5A is drawn is photographed to create an area specifying signal, the same phenomenon occurs. That is, as shown in FIG. 5B, unwanted area specifying signals 66 and 67 are produced in addition to a correct area specifying signal 65 corresponding to the triangle.

FIG. 6 shows another embodiment of this invention which solves the above problem. In this embodiment, a switch 20 is provided. The switch 20 is set on the side of a fixed contact 20b so that when the edge of the unwanted bar 83 is counted, to it changes the count of the edge counter 15 to an odd number and causes the odd/even number detection circuit 16 to generate an odd number detection signal. As a result, the reset pulse is inhibited from being supplied to the flip-flop circuit 17.

In FIG. 6, portions which are the same as those of FIG. 1 are denoted by the same reference numerals. This embodiment is similar to the first embodiment except for the following points. That is, in this embodiment, an output of the binary-coding circuit 12 is further supplied to the edge counter 31. Output data of count N2, supplied from the edge counter 31, is latched by a latch circuit 32. The edge counter 31 is reset by a horizontal synchronizing pulse Hp and the latch circuit 32 latches the count output at a timing of the pulse Hp. Outputs of the latch circuit 32 and edge counter 15 are supplied to a subtracter 33. Further, the output of the latch circuit 32 is supplied to an odd/even number detection circuit 34.

The subtracter 33 effects the arithmetic operation of (N2-N1). By this arithmetic operation, a difference between the number of edges N1 which gradually varies in one horizontal period and the total edge number N2 which is previously counted over the entire horizontal period can be sequentially obtained.

An output of the subtracter 33 is input to a comparator 35. The comparator 35 functions to check whether the output of the subtracter 33 is "1" or not. If the output of the subtracter 33 is "1", the comparator 35 generates an output of high level H. If the output of the subtracter 33 is not "1", the comparator 35 generates an output of low level L. The output of the comparator 35 is supplied to a fixed contact 36a of a switch 36. The other fixed contact 36b of the switch 36 is grounded. The odd/even number detection circuit 34 determines whether the edge count number N2 is odd or even, and generates a corresponding detection signal. The odd/even number detection signal is used as a control signal for the switch 36. The switch 36 is set on the side of the contact 36b when the count N2 becomes an even number, and on the side of the contact 36a when the count N2 becomes an odd number.

The output of the switch 36 is used as a control signal for controlling the switch 20, which is connected between the odd/even number detection circuit 16 and the reset terminal of the flip-flop circuit 17. That is, the fixed contact 20a of the switch 20 is supplied with an odd/even number detection signal or reset pulse (O-R) from the odd/even number detection circuit 16, the fixed contact 20b of the switch 20 is grounded, and the selection output terminal of the switch 20 is connected to the reset terminal of the flip-flop circuit 17. In a case where the switch 20 is set on the side of the contact 20b, the flip-flop circuit 17 is not reset even if the odd/even number detection circuit 16 outputs a odd/even number detection signal.

There are 3 edges on the horizontal line L1 of FIG. 4A, therefore the edge number 3 is counted by the edge counter 31 and latched by the latch circuit 32. When the latching operation is completed, the edge signal of the horizontal line L1 is output from the 1 H delay circuit 13. Then, the count of the edge counter 15 increases each time an edge signal is output. Therefore, data N2=3 is set from the latch circuit 32 into the subtracter 33 and counts of N1=0, 1, 2 and 3 are sequentially supplied from the edge counter 15. As a result, the output of the subtracter 33 is set to 2 (=3-1), 1 (=3-2) or 0 (=3-3) respectively when an edge signal of the bar 81 is output from the 1 H delay circuit 13, when an edge signal of the bar 82 is output, or when an edge signal of the bar 83 is output. The comparator 33 outputs a high level signal only when the output of the subtracter 33 is "1". At this time, since the odd/even number detection circuit 34 sets the switch 36 to the position of the contact 36a when an odd number is detected, a high level output signal is derived from the switch 36 when the edge of the bar 82 is detected. After this, the switch 20 is set to the position of contact 20b. As a result, even if an odd number signal is supplied from the odd/even number detection circuit 16 when the edge of the odd-numbered bar 83 is detected, it is not input to the reset terminal of the flip-flop circuit 17. Thus, an unwanted area specifying signal 64 as shown in FIG. 4B is prevented.

Figure 7:
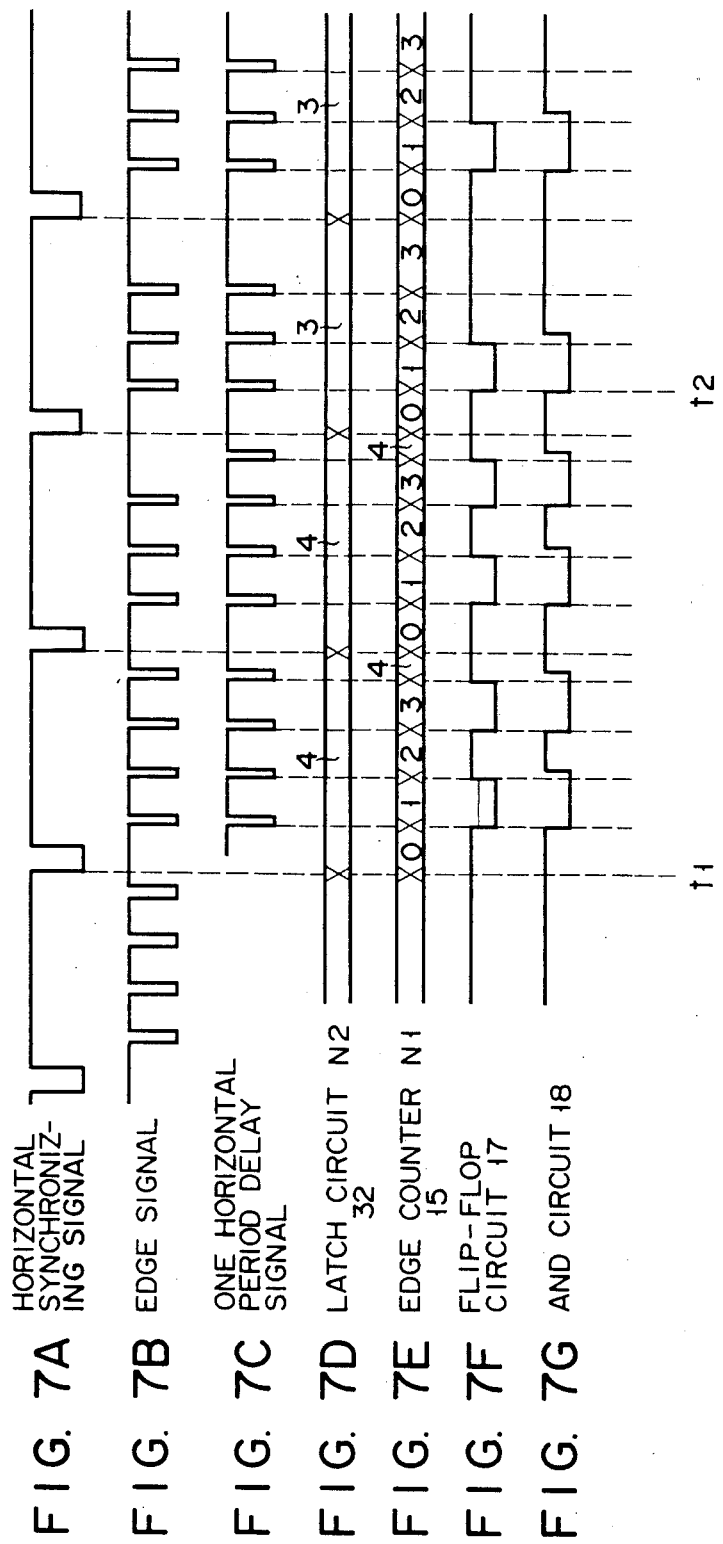
FIGS. 7A to 7G form a timing chart for illustrating the operation of the circuit of FIG. 6.

FIGS. 7A to 7G are timing charts for illustrating the operation of the device according to the embodiment of FIG. 6. FIG. 7A shows a horizontal synchronizing signal, FIG. 7B shows an edge signal input to the 1 H delay circuit 13, and FIG. 7C shows an edge signal output from the 1 H delay circuit 13. FIG. 7D shows the value N2 latched by the latch circuit 32 or the result of counting the edge signals of FIG. 7B. FIG. 7E shows the count N1 of the edge counter 15. In this operation example, the number of edge signals obtained in each horizontal period between time t1 to time t2 is even, and the number of edge signals is odd after the time t2. This is the same as in the case of the horizontal line L1. Therefore, even when the count of the edge counter 15 becomes 3 and an odd number detection signal is generated from the odd/even number detection circuit 16, the flip-flop circuit 17 is not reset since the switch 20 is set in the position of the contact 20b. FIG. 7F shows an output of the flip-flop circuit 17 and FIG. 7G shows an output of the AND circuit 18.

As described above, according to this invention, in a case where an area specifying signal for specifying a picture elimination area is stored into the memory 19, the user is only required to draw the boarder line of the area on a sheet of paper and does not have to paint out the entire area. Therefore, the pre-processing operation for specifying the area on the paper can be easily effected.

In the above embodiment, when the area specifying signal, or a signal indicating the hatched area shown in FIG. 2B, is read out from the memory 19, the switch 44 is set in the position of the contact 44b. However, it is also possible to set the switch to the position of the contact 44a when the area specifying signal is output from the memory 19, and set the switch 44 to the contact 44b at other times. This can be attained by supplying the output of the memory 19 via an inverter and using as a control signal for controlling the switch 44. In a case where the switch 44 is controlled by such a control signal, a photographed image, for example part of a mountain, appears in the hatched area of FIG. 2C, and a picture-eliminated image appears in the other portion.

In the above explanation, the picture-eliminated portion is replaced by the black or white level signal. That is, the fixed value circuit 43 is designed to output a black or white level signal. However, it is also possible to design the fixed value circuit 43 so as to output a chrominance carrier.

In this case a color specifying signal is supplied to the controller 42 via the terminal 40C. Then, the controller 42 controls an oscillator and a phase shifter of the fixed value circuit 43 so that the fixed value circuit 43 can supply a chrominance carrier having a phase corresponding to the specified color. At this time, a burst signal which is separated from the video signal at the input terminal 11a is supplied to the fixed value circuit 43, although not shown in FIG. 6. A phase locked loop circuit is constructed in the fixed value circuit 43 and the oscillator functions so as to be phase-locked with the burst signal. An output of the oscillator is supplied to the terminal 44b via the phase shifter.

Figure 8:
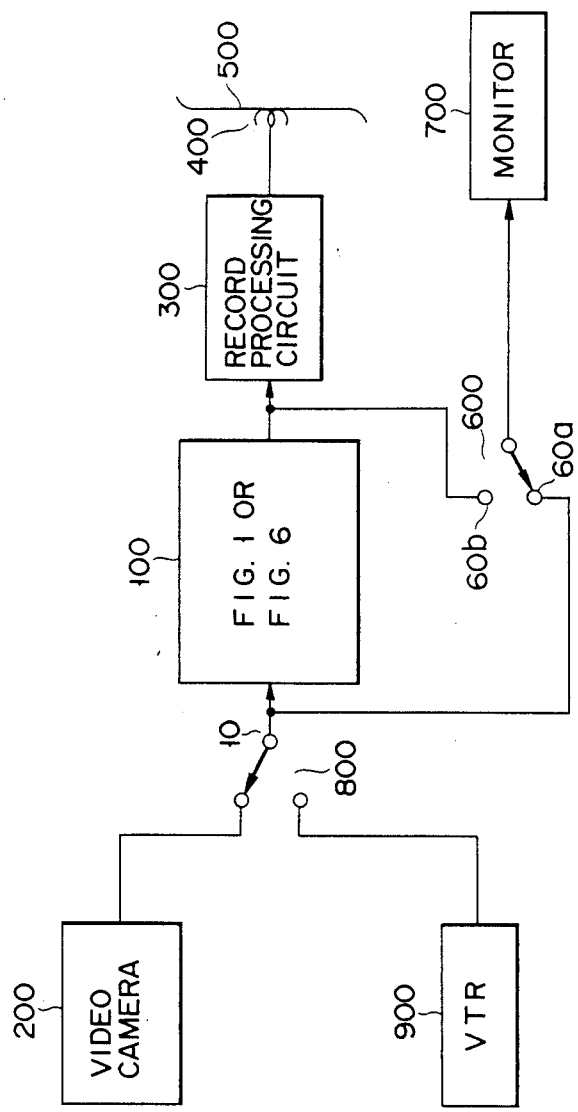
FIGS. 8 and 9 are block diagrams each showing an example of a camera-integrated type VTR in which an area specifying signal generation circuit according to this invention is used.

FIG. 8 shows the construction of a camera-integrated type VTR in which a device of this invention is applied. A video signal derived by the photographing operation of a video camera 200 is supplied to an area specifying signal generation device 100. The area specifying signal generation device 100 is constructed as shown in FIG. 1 or 6. An output of the area specifying signal generation device 100 is supplied to a record processing circuit 300. As is well known in the art, the record processing circuit 300 separates a luminance signal and a carrier chrominance signal (chroma signal), frequency-modulates the luminance signal and converts the chroma signal to a lower frequency signal. The resultant FM luminance and the lower frequency chroma signals are synthesized with each other and then supplied to a recording head 400. The recording head 400 records a signal on a magnetic tape 500 by means of the helical scanning operation.

The output terminal of the switch 10 and the output terminal of the area specifying signal generation device 100 are respectively connected to contacts 60a and 60b of a switch 600. The output terminal of the switch 600 is supplied to a monitor or view finder 700. The user can observe a signal now recorded or a signal from the video camera 200 on the monitor by operating the switch 600. While the subject used for area specification is being photographed, the switch 600 is set in the position of the contact 60a. When the to-be-processed video signal is subjected to the picture elimination process, the switch 600 is set in the position of the contact 60b. When the user finds a desired picture while observing the to-be-processed video signal, he sets the picture elimination mode. Then, the user can observe a picture elimination image on the monitor 700. The video signal to be subjected to the picture elimination process is not limited to a signal from the video camera 200. A reproduced signal from a VTR 900 can be used as a to-be-processed video signal by selectively setting the switch 800.

Figure 9:
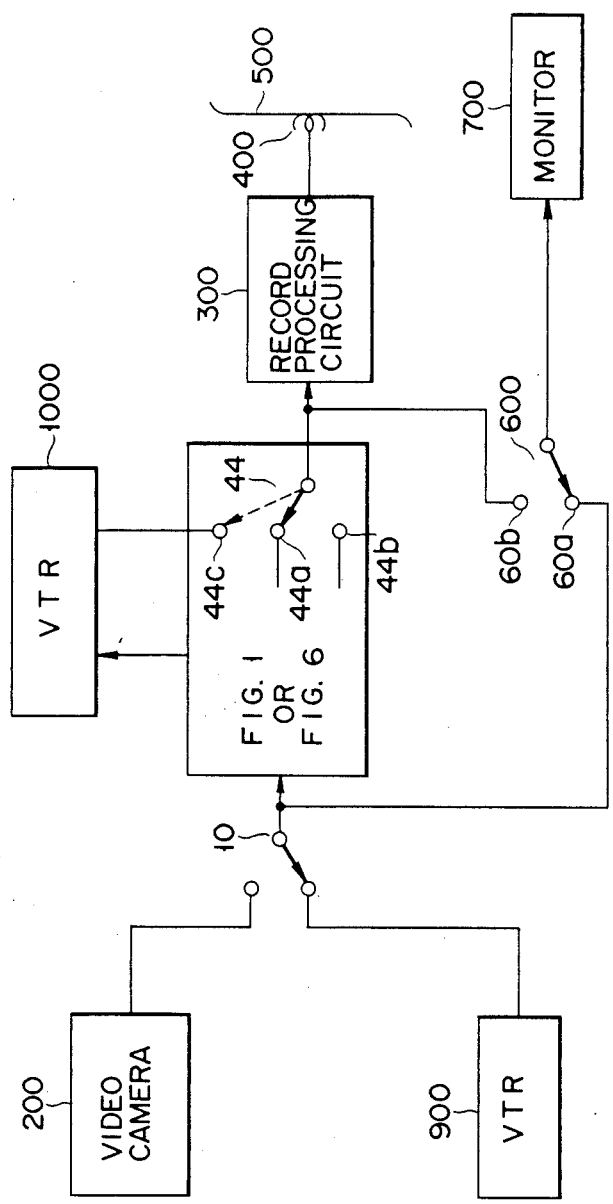

FIG. 9 also shows the construction of a camera-integrated VTR in which a device of this invention is applied. In this embodiment, a switch 44 of the area specifying signal generation device 100 is modified. That is, the switch 44 is constructed to select not only signals from a contact 11a and a fixed value circuit 43, but also a reproduced signal from a second, external VTR 1000. For this reason, a contact 44c is additionally provided. In this embodiment, an area specifying signal from the memory 19 is used to selectively set the switch 44 in the position of the contact 44a or 44c. As a result, part of an image from second VTR 1000 can be inserted into a specified area of an image from the first VTR 900, for example. This operation can be attained by selectively setting the switching position of the switch 44 by means of the controller 42. However, in order to effect the above operation, it is necessary to synchronize the reproduced signals from the first and second VTRs 900 and 1000 with each other. For this purpose, a horizontal synchronizing signal HD and a vertical synchronizing signal VD, derived from a sync separation circuit 41 arranged inside the area specifying signal generation device 100, are supplied to a servo circuit of the second VTR 1000. Thus, the operations of the first and second VTRs 900 and 1000 can be synchronized with each other.

In the embodiment of FIG. 9, part of the reproduced video signal from on of the VTRs is replaced by part of the reproduced video signal from the other VTR by using the area specifying signal. However, it is also possible to combine the video signals of photographed images of video cameras, or video signals of a VTR and a video camera, instead of combining the video signals of the two VTRs.

What is claimed is:

1. An area specifying signal generation device using an output video signal from a video camera, comprising:
   binary-coding means for converting into a binary-coded signal an image signal which is derived by photographing a subject having a solid-color surface on which an area edged or surrounded by a boarder line is specified, and which includes an edge signal corresponding to the surrounded area;

1 H delay means for delaying an output video signal of said binary-coding means by one horizontal scanning period;

edge counting means, connected to receive an output video signal from said 1 H delay means and which is reset at each horizontal period, for counting the edge signal by effecting a counting-up operation each time the edge signal corresponding to the surrounded area is supplied;

odd/even number detection means, for determining whether a counting output of said edge counting means is odd or even, and to supply an odd/even number detection signal indicating whether the counting output of said edge counting means is odd or even;

gate switching means for supplying an inverted or non-inverted signal in response to an odd number detection signal or even number detection signal from said odd/even number detection means;

a delay circuit, for delaying the output of said 1 H delay means, in order to synchronize the output of said 1 H delay means with the inverted or non-inverted output of said gate switching means;

logic means connected to receive the output of said delay circuit and the inverted or non-inverted output of said gate switching means. for supplying an output signal corresponding to the logical product of the outputs of said delay circuit and said gate switching means in order to create area specifying data, specifying an area from the odd numbered counting output to the even numbered counting output;

a memory for storing the area specifying data;

readout means for reading the area specifying data from said memory, in synchronism with a video signal to be processed; and switching means controlled by the area specifying data read out by said readout means, for replacing the to-be-processed video signal by another signal and generating the same when the area specifying data is set at a preset level.

2. An area specifying signal generation device according to claim 1, wherein said switching means for replacing the to-be-processed video signal by another signal and generating the same selects a black or white level signal as said another signal.

3. An area specifying signal generation device using an output video signal from a video camera, comprising:

for converting into a binary-coded coded signal an image signal which is derived by photographing a subject having a solid-color surface on which an area edged or surrounded by a boarder line is specified, and which includes an edge signal corresponding to the surrounded area;

1 H delay means for delaying an output video signal of said binary-coding means by one horizontal scanning period;

first edge counting means, connected to receive an output video signal from said 1 H delay means and which is reset at each horizontal period, for counting the edge signal by effecting a counting-up operation each time the edge signal corresponding to the surrounded area is supplied;

first odd/even number detection means, for determining whether a counting output of said first edge counting means is odd or even, and to supply an odd/even number detection signal indicating whether the counting output of said first edge counting means is odd or even;

gate switching means for supplying an inverted or non-inverted signal in response to an odd number detection signal or even number detection signal from said first odd/even number detection means;

a delay circuit, for delaying the output of said 1 H delay means, in order to synchronize the output of said 1 H delay means with the inverted or non-inverted output of said gate switching means;

logic means connected to receive the output of said delay circuit and the inverted or non-inverted output of said gate switching means, for supplying an output signal corresponding to the logical product of the outputs of said delay circuit and said gate switching means in order to create area specifying data, specifying an area from the odd numbered counting output to the even numbered counting output;

a memory for storing the area specifying data;

readout means for reading the area specifying data from said memory, in synchronism with a video signal to be processed;

switching means controlled by the area specifying data read out by said readout means, for replacing the to-be-processed video signal by another signal and generating the same when the area specifying data is set at a preset level:

second edge counting means, connected to receive an output video signal from said binary-coding means, for counting the edge signal by effecting the counting-up operation each time the edge signal corresponding to the surrounded area is supplied;

latching means for latching the counting value of said second edge counting means in response to a pulse during the horizontal period;

second odd/even number detection means for determining whether a counting output of said latching means is odd or even;

a subtracter for subtracting the output count of said first edge counting means from the output count of said latching means;

comparison means connected to receive an output of said subtracter, for determining whether the result of subtraction is 1 or not; and means for forcedly inhibiting an odd/even number detection signal from being supplied from said first odd/even number detection means to said gate switching means when a detection signal of said second odd/even number detection means is an odd number detection signal and an output of said comparison means is 1.

4. An area specifying signal generation device according to claim 3, wherein said switching means for replacing the to-be-processed video signal by another signal and generating the same selects a constant chrominance carrier signal as said another signal.

5. An area specifying signal generation device according to claim 3, wherein said switching means for replacing the to-be-processed video signal by another signal and generating the same selects an external video signal as said another signal.

* * * * *